United States Patent
Frayman

(10) Patent No.: US 8,659,403 B2
(45) Date of Patent: Feb. 25, 2014

(54) MOTOR GENERATED DETENT FEEL

(75) Inventor: Charles C. Frayman, Mundelein, IL (US)

(73) Assignee: Woodward MPC Inc., Skokie, IL (US)

( * ) Notice: Subject to any disclaimer, the term of this patent is extended or adjusted under 35 U.S.C. 154(b) by 235 days.

(21) Appl. No.: 13/336,666

(22) Filed: Dec. 23, 2011

(65) Prior Publication Data

US 2013/0162418 A1    Jun. 27, 2013

(51) Int. Cl.
     *G08B 6/00*      (2006.01)

(52) U.S. Cl.
     USPC ............... 340/407.2; 340/407.1; 340/691.2

(58) Field of Classification Search
     USPC ........... 340/407.2, 407.1, 691.2; 74/491, 492, 74/495
     See application file for complete search history.

(56) References Cited

U.S. PATENT DOCUMENTS

| 8,050,780 B2 * | 11/2011 | Tessier et al. ................... 700/63 |
| 8,087,619 B2 * | 1/2012 | Hanlon et al. ................ 244/223 |
| 2006/0066269 A1 | 3/2006 | Lumley et al. |

* cited by examiner

*Primary Examiner* — Toan N Pham

(74) *Attorney, Agent, or Firm* — Reinhart Boerner Van Deuren P.C.

(57) ABSTRACT

A control stick system for simulating a detent mechanism in an aircraft is provided. The detent mechanism is simulated by a motor operably coupled to a lever and configured to bias the lever such that the user experiences the feel of a traditional detent mechanism. A controller operates the motor that provides the simulated detent by receiving data from multiple sensors regarding the position and the speed of the lever and the position and the speed of a rotor assembly of the motor. Using the position and the speed measurements, the controller is able to detect when the lever is entering a specific zone of a simulated detent range. Depending on what zone the lever is in, within the simulated detent range, the controller is configured to provide a different drive current to the motor.

20 Claims, 3 Drawing Sheets

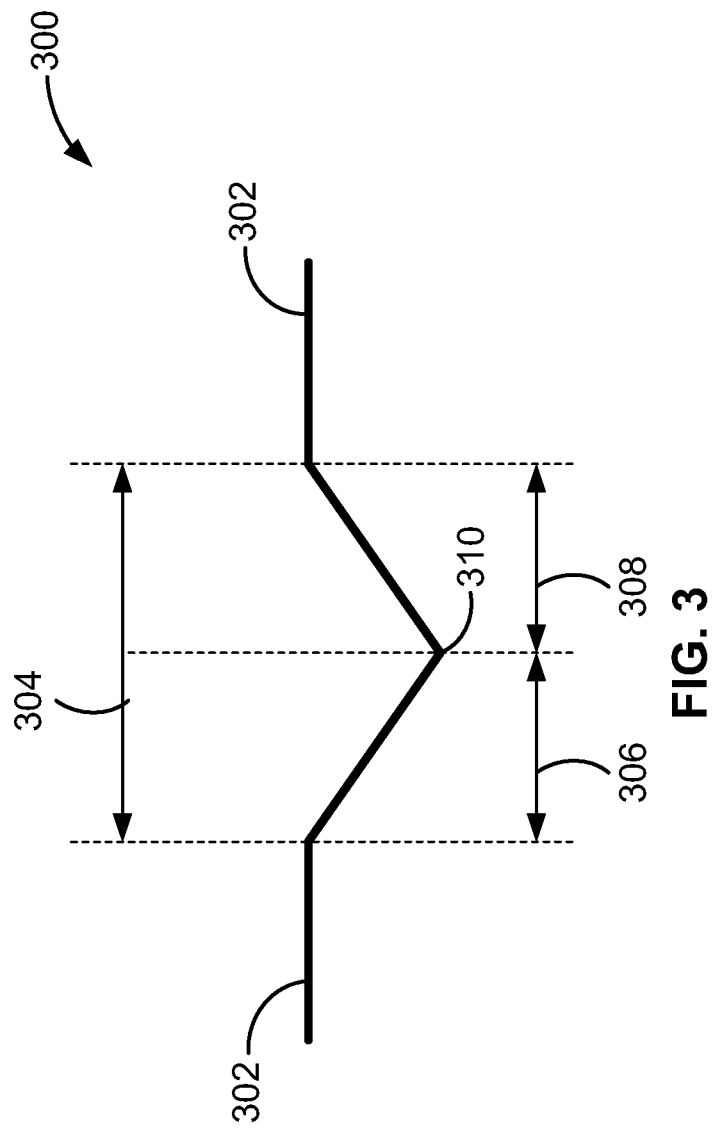

MOTOR GENERATED DETENT FEEL

FIELD OF THE INVENTION

This invention generally relates to control sticks of aircraft and more particularly to the tactile feel during actuation of the control stick.

BACKGROUND OF THE INVENTION

As the performance requirements of both military and commercial aircraft increases, conventional control technologies cannot relieve the pilot from higher mental and manual control activity. As such, today's high performance aircraft as well as some transport aircraft use sidesticks, center sticks, yokes, joysticks and control columns. As used herein, these devices will be generically referred to either as "control columns" or "control sticks," with these terms being generally synonymous in a generic sense.

The commercial and military aircraft industry is under pressure from both government and private consumer groups to build aircraft that is both safe and economical. Safety standards are imposed on the aircraft industry such that a safe and reliable experience is had for customers. Also, of importance to the aircraft industry is to build aircraft that present an economic solution to a customer's needs. A large factor that addresses economic concerns is the overall weight of an aircraft. A lighter aircraft will generally be cheaper to operate because generally the aircraft (within its flight class) will require less fuel to operate, among other reasons.

The tactile feel of the control sticks of an aircraft are an important safety aspect. The pilot needs to have tactile feedback in order to tell certain operating conditions for the engine(s) and various control systems present on modern aircraft.

One such tactile feel are detents. Typically, the detent feel provided for in the control sticks is created from a mechanical detent structure that will indicate to the person actuating the control stick that the aircraft is now in some specific mode or range of operation. However, mechanical systems are not ideal because they are both complex and heavy. Furthermore, a mechanical detent structure does not allow for the feel of the detent to be easily changed.

Therefore, electrical systems were created to reduce the complexity and weight of the previous mechanical system and allow for the ability to more easily alter the feel of the detent. Initially, analog electronic control systems were used to provide the control signals for a simple motor that would provide the detent feel. However, these analog systems were difficult to control in that they experienced a very low tolerance for component variability and would drift in operation range over time of operation and temperature during operation. To remedy this issue digital systems were implemented.

The digital systems typically use force sensors to sense the torque the operator applies to the control stick. By sensing the force applied to the control stick the digital system can determine how to properly simulate the mechanical detent feel. However, having to either sense or derive force can be a complex process in and of itself Therefore, there is a need for a safe and cost effective simulated detent feel solution that eliminates the heavy and complex mechanical solution and the overly complex digital force sensing solution. Embodiments of the present invention provide such a solution. These and other advantages of the invention, as well as additional inventive features, will be apparent from the description of the invention provided herein.

BRIEF SUMMARY OF THE INVENTION

In one embodiment, the invention provides a control stick system for an aircraft. The control stick system comprises a lever, a motor operably coupled to the lever, and a controller for controlling the motor. The controller causes the motor to bias the lever in such a manner to simulate a detent mechanism. To control the motor the controller uses a position measurement and a speed measurement of the motor and a position measurement and a speed measurement of the lever.

The position and speed measurements of both the motor and the lever come from sensors within the control stick system. A first sensor is configured to measure the speed and position of a rotor of the motor, and a second sensor is configured to measure the speed and position of the lever.

In another embodiment of the present invention, the motor is a brushless DC motor. A controller provides a drive current to the brushless DC motor that is based on position and speed measurements of a lever and position and speed measurements of a rotor of the brushless DC motor. The controller derives the drive current by providing the speed and position measurements to a series of proportional/integrator loops configured to adjust the drive current according to a preprogrammed simulated detent position.

In another embodiment, the invention provides a method of simulating a detent mechanism. A detent mechanism is simulated by sensing the position and speed of a lever, and sensing the position and speed of a rotor of a motor that is operably coupled to the lever. A controller operates the motor such that the motor biases the lever to simulate a detent mechanism based on the position and speed measurements.

In yet another embodiment, the invention provides a control stick system for an aircraft. The control stick system comprises a lever coupled to a first gear. The first gear is operably coupled to a slip clutch that is operably coupled to a reversible gear train. The reversible gear train is coupled to a motor that is configured to operably bias the lever by providing a torque to the reversible gear train.

Furthermore, the control stick system has a first resolver to measure a speed and a position of the lever, and a second resolver to measure a speed and a position of the motor. Both the first and the second resolver provide the speed and position measurements to a controller for the motor such that the motor biases the lever in such a manner to simulate a detent mechanism.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a simulated symmetrical detent according to an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
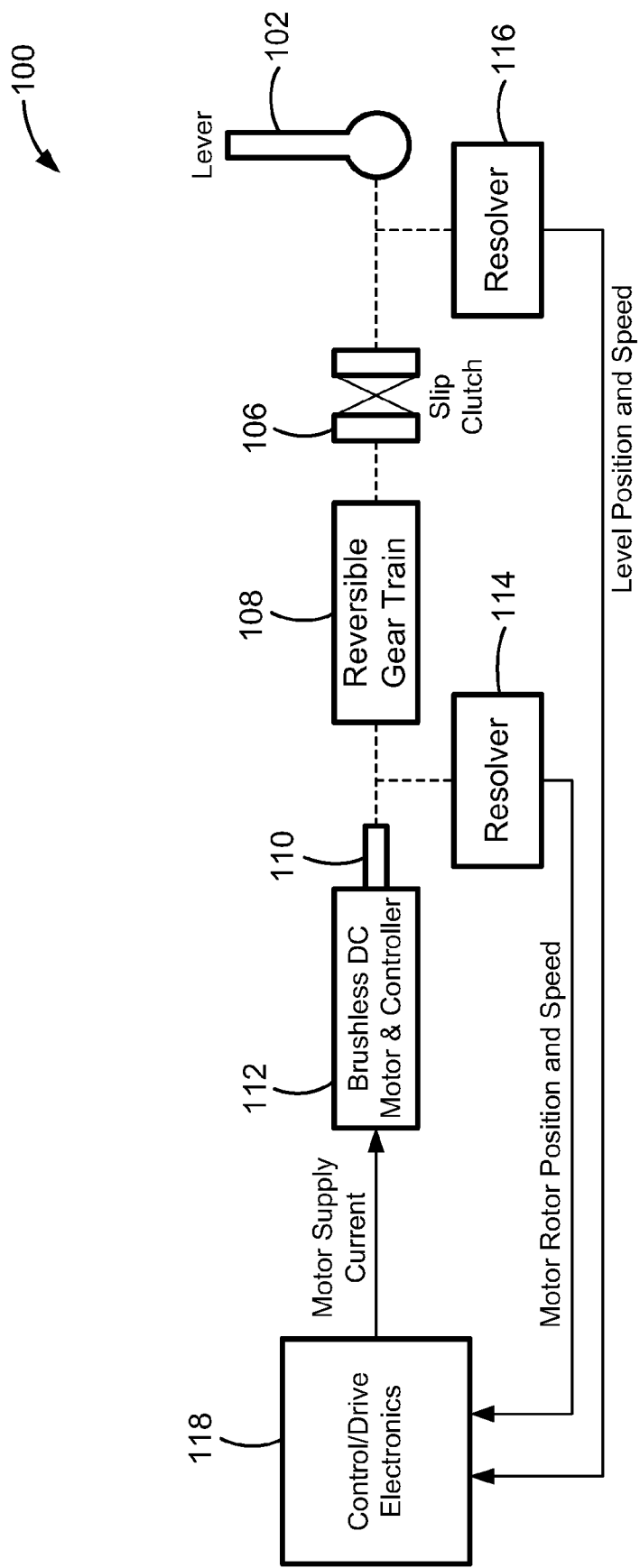
FIG. 1 is a block diagram of the mechanics of a control stick system in accordance with an embodiment of the present invention.

Turning now to the drawings, there is illustrated in FIG. 1 a block diagram of a mechanical lever and gear structure of a control stick detent system 100. The control stick system 100 includes a lever 102. Lever 102 is coupled to slip clutch 106. The slip clutch 106 serves as a safety device. Essentially, if the motor control (discussed subsequently) malfunctions, such that the user is unable to actuate the lever 102, the slip clutch 106 allows the user to override the motor control.

The slip clutch 106 interfaces with the reversible gear train 108. The reversible gear train 108 allows the user to actuate the lever 102 in either a forward or backward motion.

The motor 112 is configured to provide a torque to the reversible gear train 108 such that the user will experience a simulated detent feel when actuating the lever 102. To accomplish this at least two sensors are needed. Resolver 114 is needed to detect the position and speed of the lever 102, and resolver 116 is needed to detect the position and speed of the rotor 110. In the embodiment of the invention shown in FIG. 1, both sensors are resolvers. However, other sensors are contemplated such as a RVDT or a potentiometer.

Additionally, in the embodiment of the invention shown in FIG. 1, only a single resolver is shown for each the motor 112 and the lever 102. However, in other embodiments of the present invention multiple sensors are contemplated. The multiple sensors provide redundant systems in case of the failure of a primary or even a secondary sensor.

The control stick detent system 100 also includes a controller module 118 that is communicatively coupled to both sensor 116 and sensor 114. Speed and position information from sensors 116 and 114 is used by a control system of the controller module 118. The control system derives a supply current for motor 112, which in a particular embodiment is contemplated to be a brushless DC motor. This supply current controls the motor 112 such that the torque applied to the reversible gear train 108 (from FIG. 1) of the simulates a mechanical detent feel for the user.

Figure 2:
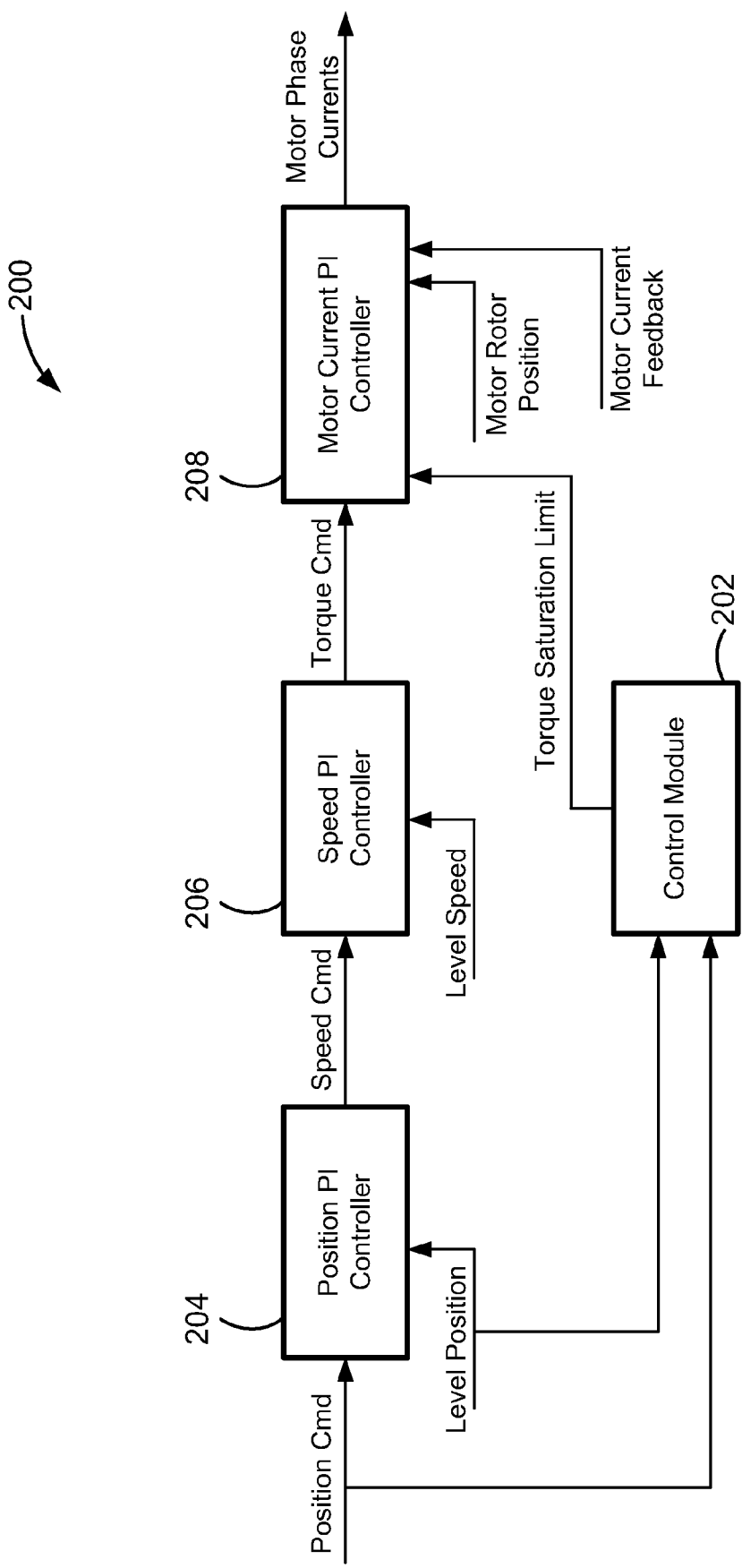
FIG. 2 is a block diagram of a controller of the control stick system, in accordance with an embodiment of the present invention.

A block diagram of the control system 200 of the controller module 118 is shown in FIG. 2. The control system 200 is preferably implemented in software that operates on the controller module 118 (from FIG. 1). The control system 200 calculates the desired torque to be produced by the motor 112 (from FIG. 1) based on position and speed information of the lever 102 from sensor 116, and position and speed information of the rotor 110 of motor 112 from sensor 114.

Control system 200 is composed of a series of three closed proportional/integrator (PI) loops. The three PI loops are a position PI controller 204, a speed PI controller 206, and a motor current PI controller 208. Additionally, the control system includes a control software module 202 that operates the three control loops 204, 206, and 208.

Essentially, the control software module 202 determines the position of the lever 102 from information provided from sensor 116. Using that position determination, the control software module 202 further determines if lever 102 is in a range of a simulated detent or not in a range of the simulated detent. The simulated detent ranges are user defined and preprogrammed in the control system 200 and provided to both the position PI controller 204 and the control software module 202.

Accordingly, the control software module 202 determines that the lever 102 is either in a simulated detent range or outside of a simulated detent range. If the control software module 202 determines that the lever 102 is not in a simulated detent range, then the control system 200 runs the motor 112 at a constant current so as to provide a resistance that mimics the feel of being between detent positions of a traditional mechanical system. If the control software module 202 determines that the lever 102 is in the range of a simulated detent, then the control system 200 runs the three PI loops 204, 206, and 208 to provide PI position control with the desired lever 102 position set at the center of the simulated detent.

The position PI controller 204 has inputs that represent the center point of the simulated detent and the current position of lever 102, as given by sensor 116 (from FIG. 1). The position PI controller calculates the difference between the center point of the simulated detent and the lever position to obtain an error. The position PI controller 204 then integrates the error to determine an average error. The actual error is added to the average error, which represents a saturation level called the speed command that is provided to the speed PI controller 206.

Along with the speed command input, the speed PI controller 206 also takes the lever speed, from sensor 116, as an input. Using these two inputs, the speed PI controller calculates the difference between the speed command and the lever speed (obtained from sensor 116) to obtain an error. The speed PI controller 206 then integrates the error to determine an average error. The difference is added to the average error, which represents a saturation level called the torque command that is provided to the motor current PI controller 208.

Along with the torque command input, a torque saturation limit input is provided to the motor current PI controller 208 from the control software module 202. The torque saturation limit is a preset value that sets a limit of the required torque needed to overcome the torque command. The motor current PI controller 208 determines a difference between the torque command and the torque saturation limit to obtain an error. The motor current PI controller 206 then integrates the error to determine an average error. The average error is added to the actual error to determine a motor drive current. The torque saturation limit will be different depending on what zone (discussed below) the lever 102 is currently in within a simulated detent range.

An individual simulated detent range is composed of multiple zones in which the motor 112 (from FIG. 1) operates with a different drive current in order to provide a different resistance profile corresponding to the desired shape of the simulated detent. Therefore, by defining different zones and correlating that to motor 112 drive current, various simulated detent shapes can be achieved.

FIG. 3 shows a symmetric simulated detent 300 in accordance with a particular embodiment of the present invention. The simulated detent 300 shows a single detent range 304 with two zones. The first zone 306 is defined to be from the start of the detent range 308 to the center of the detent 310. The second zone 308 is the center of the detent 310 to the end of the detent range 304.

In the first zone 306, the control software module 202 (from FIG. 2) sets the torque saturation limit to a constant to simulate the flat slope of the first zone 306. As the user actuates the lever 102 (from FIG. 1) and moves it into the first zone 306 the position PI controller 204 and the speed PI controller 206 detect the speed and position error of the lever 102. While the error persists, the integrator portions of the position PI controller 204 and the speed PI controller 206 gradually increase the motor drive current up to the torque saturation limit set by the control software module 202.

In the second zone 308, the control software module 202 (from FIG. 2) sets the torque saturation limit higher to simulate the feel of the lever 102 (from FIG. 1) clicking into a detent. While the lever 102 is in the second zone, the torque saturation limit is left at the increased level such that an increased force is required from the user to unseat the lever 102 out of the detent.

The actual values of the torque saturation limit are heavily influenced by the interactions of the mechanical properties of the reversible gear train 108 (from FIG. 1), the motor 112, and the control electronics module 118. Therefore, the torque saturation limit value is set experimentally to produce the desired push-back forces. Generally, the torque saturation limit of the second zone 308 should be twice the torque saturation limit of the first zone 306.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control stick system for an aircraft comprising:
   a lever;
   a motor operably coupled to the lever and configured to operably bias the lever; and
   a controller operably controlling the motor such that the motor biases the lever in such a manner to simulate a detent mechanism, based on a position measurement and a speed measurement from the motor and a position measurement and a speed measurement from the lever.

2. The control stick system of claim 1, wherein the position and speed measurement from the motor is provided by a resolver configured to monitor a rotor of the motor.

3. The control stick system of claim 1, wherein the position and speed measurement from the lever is provided by a resolver.

4. The control stick system of claim 3, wherein the position and speed measurement from the lever is provided by a second resolver.

5. The control stick system of claim 1, wherein the controller regulates a current supplied to the motor.

6. The control stick system of claim 5, wherein the current supplied to the motor changes based on the position measurement and the speed measurement from the motor and the position measurement and the speed measurement from the lever in order to create a simulated detent.

7. The control stick system of claim 6, wherein the simulated detent defines zones of operation for the motor.

8. The control stick system of claim 1, further comprising a slip clutch configured between the lever and the motor.

9. The control stick system of claim 8, further comprising a reversible gear train configured between the slip clutch and the motor.

10. The control stick system of claim 1, wherein the motor is a brushless DC motor.

11. The control stick system of claim 10, wherein the controller operably controls the motor by setting a drive current for the motor.

12. The control stick system of claim 11, wherein the controller comprises a first proportional/integrator loop for tracking the position of the control stick, a second proportional/integrator loop for tracking the speed of the control stick, and a third proportional integrator loop for setting the drive current for the motor.

13. A method of simulating a detent mechanism comprising:
   sensing a position and speed of a lever;
   sensing a position and speed of a motor operably coupled to the lever and configured to operably bias the lever; and
   controlling the motor such that the motor biases the lever in such a manner to simulate a detent mechanism, based on the position and speed of the motor and the position and speed of the lever.

14. The method of claim 13, wherein sensing the position and speed of the lever is done by a resolver.

15. The method of claim 14, wherein sensing the position and speed of the lever is done by a second resolver.

16. The method of claim 13, wherein sensing the position and speed of the motor is done by a resolver.

17. The method of claim 13, wherein the motor is a brushless DC motor powered by a drive current.

18. The method system of claim 17, wherein the drive current supplied to the motor changes based on the position and speed of the motor and the position and speed of the lever in order to create a simulated detent.

19. The method of claim 18, wherein controlling the motor comprises setting the drive current for the motor by providing a position of a simulated detent and the position of the control stick to a first proportional/integrator loop to track a position of the control stick relative to the simulated detent position to obtain a relative position of the control stick, providing the relative position of the control stick and the speed of the control stick to a second proportional/integrator loop to track the speed of the control stick relative to the control sticks position within the simulated detent to obtain a relative speed of the control stick, and providing the relative speed of the control stick and a saturation limit to a third proportional/integrator loop to determine the drive current.

20. A control stick system for an aircraft comprising:
a lever;
a slip clutch operably coupled to the lever;
a reversible gear train operably coupled to the slip clutch;
a motor operably coupled to the reversible gear train and configured to operably bias the lever by providing a torque to the reversible gear train;
a first resolver configured to measure a speed and a position of the lever;
a second resolver configured to measure a speed and a position of the motor; and
a controller operably controlling the motor such that the motor biases the lever in such a manner to simulate a detent mechanism, based on measurements from the first resolver and the second resolver.

* * * * *